United States Patent [19]

Wagner

[11] Patent Number: 4,673,380
[45] Date of Patent: Jun. 16, 1987

[54] IDLER ROLLER

[75] Inventor: Horst R. Wagner, Transvaal, South Africa

[73] Assignee: Horst Reinhold Wagner, Trustee, H&L Wagner Family Trust, Transvaal, South Africa

[21] Appl. No.: 787,890

[22] Filed: Oct. 16, 1985

[30] Foreign Application Priority Data

Oct. 17, 1984 [ZA] South Africa ............... 84/8101

[51] Int. Cl.[4] ............................................. F16H 55/36
[52] U.S. Cl. ..................................... 474/90; 474/192; 361/212
[58] Field of Search ................. 474/166, 90, 178, 184, 474/190, 192, 199; 271/208, 901, 193; 361/212, 214, 221

[56] References Cited

U.S. PATENT DOCUMENTS

| 628,521 | 7/1899 | Campbell | 474/199 X |
|---|---|---|---|
| 1,966,587 | 7/1934 | Klein | 361/221 X |
| 2,120,875 | 6/1938 | Tatnall | 474/190 |
| 2,295,134 | 9/1942 | Smith | 361/214 |
| 2,996,646 | 8/1961 | Wilson | 361/221 |

FOREIGN PATENT DOCUMENTS

| 1046930 | 12/1953 | France | 474/199 |
|---|---|---|---|
| 1100747 | 9/1955 | France | 474/190 |
| 806608 | 10/1981 | South Africa . | |

Primary Examiner—James A. Leppink
Assistant Examiner—Bruce M. Kisliuk
Attorney, Agent, or Firm—Pennie & Edmonds

[57] ABSTRACT

An idler roller consists of a roller body which comprises a plastic core having a bore to accommodate an idler shaft and a shell of polyurethane located around the core to provide a tubular load-bearing wall. Bearing assemblies are located within the roller body at each end thereof for receiving the idler shaft. A channel-shaped metallic insert is embedded in the shell, the insert spiralling around the whole length of the core. An electrically conductive clip or the like connects the metallic insert to a bearing assembly to drain any electrostatic charge formed on the surface of the polyurethane shell away from the shell via the bearing assembly to the idler shaft.

11 Claims, 2 Drawing Figures

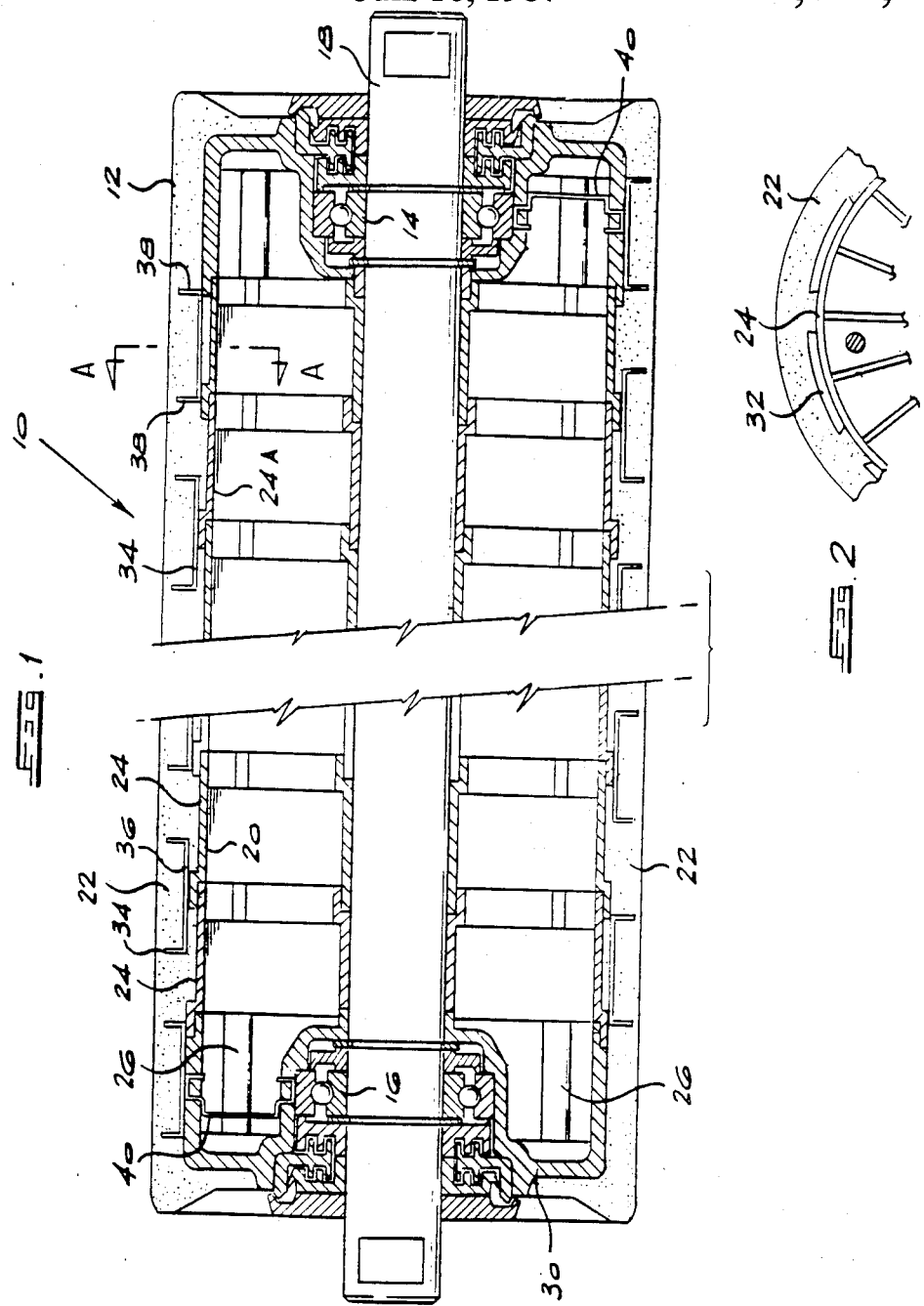

IDLER ROLLER

BACKGROUND OF THE INVENTION

This invention relates to an idler roller particularly for a belt conveyor.

Several types of idler rollers are utilised in the converyor industry including transporting idler roller, return idler rollers and impact idler rollers. Conventionally, these idler rollers comprise a tubular roller body having a bore to accommodate an idler shaft and bearing assemblies located at each end of the roller body for mounting the idler shaft. The roller body may be constructed of steel or plastic material. Plastic roller bodies have the advantage that they are lighter than steel roller bodies but have the disadvantage that there may be a build-up of electrostatic charge on the surface of the roller body which may affect the operation of the idler roller.

South African Pat. No. 80/6608 (and corresponding U.S. Pat. No. 4,440,295) discloses an idler roller which comprises a prefabricated core having a bore to accommodate an idler shaft, and a shell of synthetic plastic material moulded around the core to provide a tubular load-bearing wall and end walls integral therewith. In the specification of this patent, it is stated that metallic additives or inserts may be used in the roller which would serve to prevent build-up of static by draining any charge formed via the bearings and the idler roller shaft. However, this patent does not give any guidance as to the form or construction of such metallic additives or inserts or how they may be included in the idler roller.

SUMMARY OF THE INVENTION

According to the invention, there is provided an idler roller comprising a roller body which comprises a core having a bore to accommodate an idler shaft and a shell of a plastic material located around the core to provide a tubular load-bearing wall, bearing assemblies located within the roller body at each end thereof for receiving the idler shaft, a metallic insert embedded in the shell, the insert spiralling around substantially the whole length of the core, and electrically conductive means connecting the insert to at least one of the bearing assemblies, the insert and the electrically conductive means being adapted to drain any electrostatic charge formed on the surface of the shell away from the shell via the bearing assembly to the idler shaft.

The metallic insert is preferably a channel-shaped member having a base and side walls with the base of the channel-shaped member being located on the core and with the walls of the channel-shaped member extending through the shell of plastic material. The metallic insert should not protrude out of the shell to avoid damage to a belt or the like resting on the roller.

The metallic insert is preferably perforated or of a mesh-like construction to reduce the weight of the insert and to make the insert more flexible.

The core may comprise a metal tube to which the metallic insert is attached by means of welding or the like. In this case, the electrically conductive means is preferably a spring or a clip located between the core and the bearing assembly.

Alternatively the core may comprise a right circular cylinder manufactured from a suitable plastic material, to which the insert is attached. In this case, the electrically conductive means is preferably a spring or clip attached to the metallic insert and to the bearing asssembly. The right circular cylinder may be formed from a plurality of right circular cylindrical sections connected to each other.

The shell of a plastic material is preferably a shell of polyurethane.

BRIEF DESCRIPTION OF THE DRAWINGS

FIG. 1 is a schematic sectional view of an idler roller according to the invention; and FIG. 2 is a view along the line A—A of FIG. 1.

DESCRIPTION OF PREFERRED EMBODIMENTS

Referring to the drawings, there is shown an idler roller 10 comprising an idler roller body 12, two bearing assemblies 14 and 16, and an idler roller shaft 18.

The idler roller body 12 comprises a tubular plastic core 20 and a shell 22 of a plastic material located around the core 20 to provide a tubular load-bearing wall. The core 20 comprises a series of right circular cylindrical sections 24 which interconnect with each other and which are held together by means of tie rods 26 which are attached to end caps 28 and 30. The sections 24 are formed with ribs 32 on their outside to provide good mechanical interlocking between the core 20 and the plastic shell 22. This is illustrated very clearly in FIG. 2.

A channel-shaped perforated metallic insert 34 is spiralled around the core 20 with the base 36 of the metallic insert 34 being located on the core 20 and optionally attached thereto, and with the walls 38 of the metallic insert 34 extending through the shell 22. The walls 38 may reach the surface of the shell 22 but should not protrude therefrom to avoid damage to a belt or the like resting on the roller 10. The metallic insert 34 may be attached to the core 20 by any suitable means. Clips 40 are located between the metallic insert 34 and the bearing assemblies 14 and 16 to provide an electrically cnductive path form the metallic insert 34 to the bearing assemblies 14 and 16 and thus to the idler roller shaft 18. In this way, electrostatic charge which forms on the outer surface of the shell 22 is drained via the metallic insert 34, the clips 40 and the bearing assemblies 14 and 16 to the idler roller shaft 18 and then out of the idler roller 10.

The shell 22 of the idler roller 10 is made of a suitable plastic material such as polyvinyl chloride or preferably polyurethane.

The core 20 of the idler roller 10 may be manufactured from any suitable rigid plastic material.

The idler roller of the invention has the advantage that any electrostatic charge which forms on the surface of the roller is drained away therefrom.

I claim:

1. An idler roller comprising a roller body which comprises a core having a bore to accommodate an idler shaft and a shell of a plastic material located around the core to provide a tubular load-bearing wall, bearing assemblies located within the roller body at a first end and a second end thereof for receiving the idler shaft, a metallic insert embedded in the shell, the insert spiralling around the core for substantially its whole length, and electrically conductive means connecting the insert to at least one of the bearing assemblies, the insert and the electrically conductive means being adapted to drain any electrostatic charge formed on the surface of the shell away from the shell via the bearing assembly to the idler shaft.

2. An idler roller according to claim 1 wherein the metallic insert comprises a channel-shaped member having a base and side walls, with the base of the channel-shaped member being located on the core and with the walls of the channel-shaped member extending through the shell of the plastic material.

3. An idler roller according to claim 1 wherein the metallic insert is perforated.

4. An idler roller according to claim 1 wherein the metallic insert is of a mesh-like construction.

5. An idler roller according to claim 1 wherein the core comprises a metal tube.

6. An idler roller according to claim 5 wherein the metallic insert contacts the metal tube and wherein the electrically conductive means comprises a spring or a clip located between the metal tube and a bearing assembly.

7. An idler roller according to claim 1 wherein the core comprises a right circular cylinder of a suitable plastics material.

8. An idler roller according to claim 7 wherein the core comprises a plurality of right circular cylindrical sections adapted to be connected to each other to form the right circular cylinder.

9. An idler roller according to claim 7 wherein the metallic insert contacts the right circular cylinder and wherein the electrically conductive means comprises a spring or a clip located between the metallic insert and a bearing assembly.

10. An idler roller according to claim 1 wherein the shell of a plastic material comprises a shell of polyurethane.

11. An idler roller according to claim 8 wherein the metallic insert contacts the right circular cylinder and wherein the electrically conductive means comprises a spring or a clip located between the metallic insert and a bearing assembly.

* * * * *